(12) United States Patent
Cordova

(10) Patent No.: US 8,923,684 B2
(45) Date of Patent: Dec. 30, 2014

(54) COMPUTER-IMPLEMENTED VIDEO CAPTIONING METHOD AND PLAYER

(75) Inventor: Gay Cordova, Tucson, AZ (US)

(73) Assignee: CCTubes, LLC, Tucson, AZ (US)

( * ) Notice: Subject to any disclaimer, the term of this patent is extended or adjusted under 35 U.S.C. 154(b) by 122 days.

(21) Appl. No.: 13/471,741

(22) Filed: May 15, 2012

(65) Prior Publication Data

US 2012/0301111 A1  Nov. 29, 2012

Related U.S. Application Data

(60) Provisional application No. 61/489,194, filed on May 23, 2011.

(51) Int. Cl.
  *H04N 5/761* (2006.01)
  *H04N 9/82* (2006.01)
  *H04N 5/445* (2011.01)

(52) U.S. Cl.
  CPC ............. *H04N 9/8205* (2013.01); *H04N 5/445* (2013.01)
  USPC .......................................... 386/282; 386/278

(58) Field of Classification Search
  None
  See application file for complete search history.

(56) References Cited

U.S. PATENT DOCUMENTS

| | | |
|---|---|---|
| 6,564,383 B1 | 5/2003 | Combs et al. |
| 7,039,633 B1 | 5/2006 | Dey et al. |
| 7,095,947 B2 | 8/2006 | van der Schaar |
| 7,221,405 B2 | 5/2007 | Basson et al. |
| 7,421,477 B2 | 9/2008 | Pettinato |
| 7,607,149 B2 | 10/2009 | Barone, Jr. et al. |
| 7,802,177 B2 | 9/2010 | Dey et al. |
| 7,826,714 B2 | 11/2010 | Berstis et al. |
| 7,870,279 B2 | 1/2011 | Chuang et al. |
| 7,889,964 B1 | 2/2011 | Barton et al. |
| 2008/0059989 A1* | 3/2008 | O'Connor et al. ................ 725/9 |
| 2009/0013252 A1* | 1/2009 | DeWitt ......................... 715/716 |
| 2010/0332464 A1* | 12/2010 | Iwai et al. ..................... 707/707 |
| 2011/0074667 A1* | 3/2011 | Robinson ...................... 345/156 |
| 2011/0283304 A1* | 11/2011 | Roberts et al. .................... 725/9 |
| 2014/0142941 A1* | 5/2014 | Harrenstien et al. .......... 704/235 |

* cited by examiner

*Primary Examiner* — William C Vaughn, Jr.
*Assistant Examiner* — Eileen Adams
(74) *Attorney, Agent, or Firm* — Yakov Sidorin; Quarles & Brady LLP

(57) ABSTRACT

A computer-implemented video-player for adding and/or editing a time-sequenced caption to a video stream already stored on a web-site or uploaded by the user. A method and computer program product effectuating such manipulation of a caption in relation to the video stream. Editing of the caption can be effectuated only by a user who has created the caption. The video-player plays the video-stream with the caption overlayed on the video in a window movable, at user's discretion, across the screen of the video-player. The video stream and the associated caption are stored, generally, in different storages, with the caption being stored in association of a site or device hosting the video-player.

15 Claims, 10 Drawing Sheets

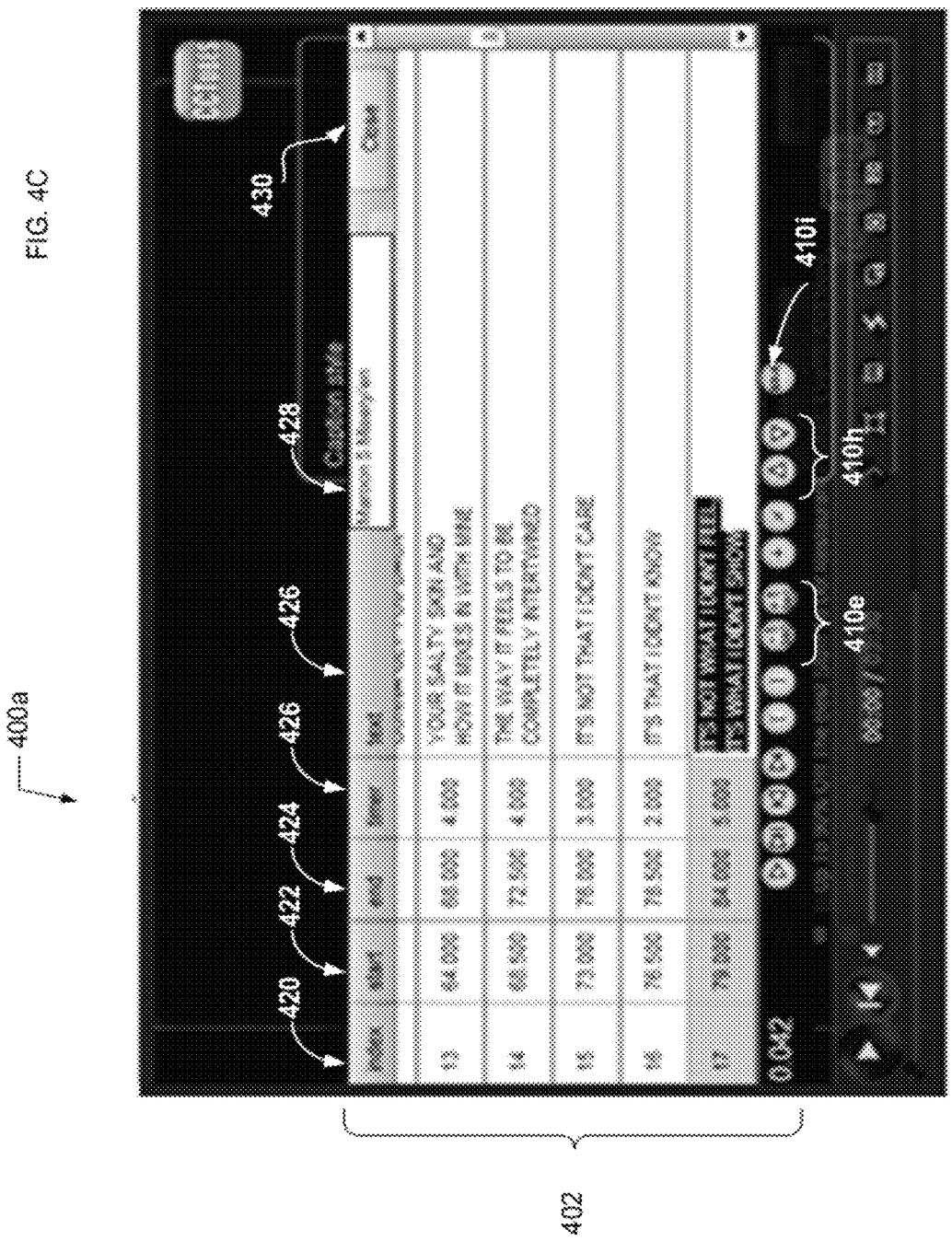

US 8,923,684 B2

COMPUTER-IMPLEMENTED VIDEO CAPTIONING METHOD AND PLAYER

CROSS-REFERENCE TO RELATED APPLICATIONS

This application claims priority under 35 U.S.C. §119(e) to U.S. Provisional Patent Applications No. 61/489,194 filed May 23, 2011. The disclosure of the above-mentioned application is incorporated herein by reference in its entirety.

TECHNICAL FIELD

The present invention relates to a field of captioning of videos and, more particularly, to a computer-implemented player having a captioning capability.

BACKGROUND ART

The present invention relates generally to video captioning and, in particular, to apparatus and method of defining a caption, corresponding to a chosen video stored on the internet, and mapping the defined caption to a caption map from which the caption in question is retrieved and presented for viewing, in the apparatus of the invention, simultaneously with streaming of the chosen video through the apparatus.

SUMMARY OF THE INVENTION

Embodiments of the invention provide an article of manufacture that includes a programmable processor; and a non-transitory tangible computer-readable storage medium having computer-readable program product disposed therein to stream video data stored in a storage associated with a web-site (which storage is in communication with said article of manufacture). The computer-readable program product contains computer-readable code that, when programmed in association with the processor, causes said programmable processor to effect (i) implementing, on a monitor, a video-viewing apparatus having a computer-implemented graphical user interface (UI); (ii) retrieving, in response to a user input applied to said UI, video data identified by the user from said storage; and (iii) displaying of retrieved video data, on said video-viewing apparatus, juxtaposed with graphical data representing contents of said video data. The video-viewing apparatus includes as least a screen portion and a console portion. The console portion optionally circumscribes the screen portion and contains: actuators and associated indicia, a first window containing visually-perceivable identifier representing the retrieved video data, and a second window configured to receive user input. The implementing of a video-viewing apparatus includes displaying the video-viewing apparatus on the display. In one implementation, the video-viewing apparatus additionally includes a caption module adapted to be actuated with one of the actuators of the console portion, to display textual data corresponding to the video data and stored on the storage medium, to edit at least a portion of the textual data, and to form new textual data representing contents of said video data.

The displaying of retrieved video data includes receiving, at the programmable processor and from the non-transitory tangible computer-readable storage medium, of textual data representing contents of the video data; and displaying the received textual data, in a form of a text string, in a window movable across said video-viewing apparatus in response to a user input. In one implementation, such displaying includes displaying the textual data synchronized with said video data in a frame-specific manner. The UI includes one or more actuators and indicia associated with such actuators and representing, to the user, operational characteristics of these actuators. The actuators are configured to trigger, in response to a user input, at least one of establishing an operational communication with the web-site; determination of a presence of the textual data on that web-site; creating the textual data if it does not exist; creating an identifier for the textual data and storing the identifier on the non-transitory tangible computer-readable storage medium; uploading the textual data to a video-viewing apparatus; synchronizing the uploaded textual data with the video data on a frame-by-frame basis and storing data representing feedback to the video data by the user.

Embodiments of the invention further include a computer program product for displaying, on a computer-implemented video-player, video data overlayed with text representing contents of such video data. Here, the computer program product contains a computer-usable tangible storage medium containing a computer-readable program code. The computer-readable program code, in turn, contains program code for: (i) implementing, in a computer-system, a visually-perceivable video-player having a monitor and a console, associated with such monitor and hosting a user-interface (UI) having actuators responsive to a user input, and (ii) activating, in response to the input, an operation of the visually-perceivable video-player by applying the user input to one or more of said actuators.

The computer-readable program code further contains program code for, in response to an input from a user applied to said UI:—retrieving video data stored on an identified server,—determining if said video data has associated text representing contents of said video data,—when said video data does not have said associated text and following a user authorization, receiving new text representing said content and creating tag representing an identity of the authorizing user,—editing any of the associated text and new text to form edited text; and storing said edited text in association with said computer-usable tangible storage medium. The computer-readable program code further contains program code for displaying, on the monitor, the retrieved video-data overlayed with a window containing any of the associated text, new text, and edited text such that the window can be moved across the monitor in response to a user input.

In one implementation, the computer-readable program code may further include program code for embedding, in response to a user input, the visually-perceivable video-player on a web-site specified by the user. Alternatively or in addition, the program code for editing may include program code for creating a computer-implemented and visually-perceivable caption module, which module is equipped with (a) a window portion configured to display an interactive list of text strings available for editing by the user, and (b) a caption editor equipped with an array of activators configured to implement frame-specific time-sequenced coordination of a test string, selected by the user from said list, with said video data. In a specific implementation, the program code for storing includes program code for storing the edited text in association with the computer-usable tangible storage medium and accompanied by storing at least one tag representing a visually-perceivable characteristic of the edited text but not its content. In such specific implementation, the program code for editing optionally includes program code for (i) requesting and receiving, from a user, a user ID, (ii) comparing such received user ID with the tag representing an identity of the authorizing user, (iii) editing any of content and style of said new text when said received user ID matches said tag, and editing only style of said new text when said received user ID does not match said tag.

Embodiments of the present invention additionally include a method for captioning a video stream with a use of a computer-implemented video player, which method effectuates at least the operation of such video player and storing the resulting caption and additional data representing characteristics of captioning process and user identifiers in association with a web-site or device hosting the computer-implemented video player, as described in this application. Embodiments of the present invention also include such a video-player, implemented in a computer system.

BRIEF DESCRIPTION OF THE DRAWINGS

The invention will be more fully understood by referring to the following Detailed Description of Specific Embodiments in conjunction with the Drawings, of which:

FIG. 4C shows a display of the Caption Editor with a caption-editing window containing captions created in response to the user input;

DETAILED DESCRIPTION OF SPECIFIC EMBODIMENTS

Figure 1:
FIG. 1 shows an embodiment of a console of the player of the invention.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented in this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

Furthermore, the described features, structures, or characteristics of the invention may be combined in any suitable manner in one or more embodiments. Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown. The invention as recited in claims appended to this disclosure is intended to be assessed in light of the disclosure as a whole.

In accordance with preferred embodiments of the present invention, methods and apparatus are disclosed for accessing embedded videos with the added benefit of a text file that has been created in response to the user's input based at least in part on the contents of such video and configured to be displayed contemporaneously with the video streamed through the apparatus of the invention.

Embodiments of the invention provide a caption system and method according to which a user can retrieve a video stored by a third-party content provider in association with such content-provider's web-site; stream the retrieved video through a computer-implemented video-viewing apparatus; in a case when the video being streamed does not have a corresponding text caption, add such a caption in a frame-specific manner; and store the created caption on the system for a future contemporaneous (and, optionally, synchronized) re-play with the same video when the video is being again streamed through the apparatus of the invention. One embodiment of the invention is further configured to receive a video uploaded, through the apparatus of the invention, by the user himself, and to perform the caption-related transformation of the uploaded video as mentioned above.

An embodiment of the invention may be referred to in this disclosure as a "player." A player includes a computer program product that can be loaded onto a computer either as a stand-alone computer-implemented apparatus or as a computer-implemented apparatus embedded in a web-site and configured to run on any of a variety of web-browsers including, but not limited to, Internet Explorer and Mozilla Firefox. A player is further adapted to act as a user interface through which a user can request a particular video-stream saved on an internet-site storage (such as YouTube, for example) or uploaded by the user himself to be played in a display window of a player, and to create a text-caption for the video being played as a discretion of and according to a direction by the viewer. The created caption and an identifier for the video to which this caption corresponds are stored in a tangible computer-readable memory that is associated with an embodiment of the player, thereby forming a library of captions to various retrievable-from-the internet videos or videos that have been uploaded by the user. When a user activates a player with intention to stream a particular video from the internet through the player, or to replay a previously uploaded and stored at the memory of the player video, the apparatus verifies if this particular video has a corresponding identifier. Should such identifier exist, the apparatus activates the caption by correlating the specific chosen caption file and playing it over the video being streamed/replayed and presenting both the video and the retrieved caption contemporaneously and, optionally, synchronically on a display of the player.

A simple analogy with sun-glasses may provide additional insight in the idea of the invention. Sun-glasses (and, in general, an optical filter) are known to transform at least a spectral content of light transmitting from the visual scene through the sun-glasses/optical filter to reach a light-detecting system (for example, an eye of the viewer). Simply put, the content of light transmitted through the optical filter is a product of the spectral content of the incident light and a spectral transmission function of the filter. By comparison, an embodiment of the invention is configured to perform as a computer-implemented filter of sorts, one of the functions of which is to modify at least video content transmitted to the viewer as a result of a particular video (such as a movie) being streamed in real time from the web-site of the content-provider (for example, video/movie provider) through the embodiment of the invention by overlaying on it and/or embedding in it a caption (that has been previously created with the use of the embodiment and in association with the same video being streamed through the embodiment). The resulting video-stream reaching the viewer is a combination of content of the video and that of the caption.

In one embodiment, the player is cooperated with and/or integratable with a web-site hosting the caption-adding and captioned-video-replay services, and is adapted to provide the use of such services with users registered as members on the hosting web-site. In another embodiment, the player may be configured as a stand-alone software-implemented player (that can be run as a separate program) the activation and use of which is coordinated with a subscription to provided services. In either case, an embodiment of the player is configured to upload a specific, user-indicated video and a separate text file and have the text file display its content on or in association with the video during its play. As videos are uploaded and tags are assigned to them, the number of times a tag is used will be shown by their relative size and color in a tag cloud. The tag cloud is configured to allow a user to click on a tag to open a tag page that lists all videos associated with that tag. In one embodiment, the list page contains at least the following information: (i) Thumbnail image of the video—"clickable" to open the video viewing page; (ii) Video title—"clickable" to open the video viewing page; (iii) Short description of the video; and (iv) All video tags.

The following lists, without limitation, various aspects that embodiments of the player feature. Generally, the visual manifestation of the player as presented to the user on a monitor such as a computer monitor, for example, contains virtual buttons and/or menus (labeled with visual indicia such as "Upload Text File" button, "Multiple Text Files" button, "Synchronize" button, "CC" button, "Embeddable Player" button, "Loadable Player" button, "Speed" button, "Text Display" button, "Video Size" button, "Volume" button, "Pause/Play" button, Play Length Scroll bar, "Embed" button, "Link" button, "Favorites" button, "Rate" button, Comments area, "Playlist" activator and the like) that, when activated by the user, trigger generally the following functionalities of an embodiment of the invention:

The "Upload" and "Multiple Text Files" or equivalent activators are configured to load and use, at the user's input, standard text file(s). Optionally, the player may be adapted to operate with multiple text files (for example, files in multiple languages with a default of English language) associated with the chosen video such as to allow the user to choose which text file is to be played with the video. In a specific embodiment, the player may include a computer-implemented translator module that is adapted to provide as an output a translation of the text file received, at user's direction, at the input of the module.

In response to user-activation of the "Synchronize" button or an equivalent virtual trigger, for example, the system is configured to coordinate the re-play of the text file (a caption) that has been previously created and uploaded for use with the system. Generally, the speed of playing the text file in association with the video stream can be varied, thereby allowing the user to play the video and the text file synchronically. In particular, the replay of the caption including multiple sub-caption portions is adapted to start, pause, and re-start at specific times coordinated with specific frames of the video being streamed.

The activation of the "CC" virtual button or the like causes, in one embodiment, the creation of a caption text file in coordination with a particular video. In a related embodiment, the activation of the "CC" virtual button may cause the previously-created caption be played with the video. If there are more than one text files, then the "CC" button may cause the activation of a scroll-down list containing identifiers of text files to facilitate the choice of a particular file to be played with the video.

In response to user's triggering the "Embeddable Player" virtual key, the embodiment of a player is caused to be embedded on a web-site specified by the user, optionally accompanied by a pre-determined logo associated with all videos played through the player. Similarly, with the use of a "Loadable Player" key an embodiment of the player of the invention is loaded on a user-specified web-site. The terms "embed", embedding" and the like generally refer to creation of a particular association between a guest, a host, and a storage. For example, while a given video can be stored on a specifically identified web-site, this video can be played through the player's website by having the video embedded at the player's web-site. In this case, the video stored on and retrieved from the third-party site is a guest on a player's web-site, which is a host. In comparison, as a result of uploading a video on a particular website, the uploaded video will be stored and reside on the particular website.

Embodiments of the invention employ the "Speed" virtual button in association with a computer-implemented apparatus feature configured to change the speed at which the caption text is being displayed in correspondence with the played video file. In addition, the "Text Display" virtual button is adapted to cause, at user's direction, relocation of the text region in which the caption is being displayed on the screen across the screen (either from the default position at the bottom of the screen or from any other pre-determined position at the screen). A caption is displayed in a video layer that is overlaid on the main video. Such "video overlay" may be configured as a bar region movable across the screen up and down and sideways to display the caption in a position in which the caption does not block a portion of the video identified by the user (such as graphical portions of the video or an advertisement portion, for example).

The screen of the player, as displayed for the user, can be re-sized, with the use of the "Video Size" button, from the smallest size to a full size viewable at a given monitor. Moreover, in accommodation of the needs of the user, the volume of sound provided by an embodiment of the player can be varied, through the user's interaction with the "Volume" activator, and a play process can be stopped, paused, and re-started at the user's discretion with the use of "Pause/Play" virtual button.

A scroll bar such as a "Play Length" bar, or another virtual player-function activator on the screen formatted according to an embodiment of the invention, is adapted to cause a showing of how much of the video has played in relation to a video-portion remaining to be played and to allow the user to restart a replay at any point along the length of the video. In addition, embodiments of the invention are configured to rate a user-identified combination of a video and an associated caption text file (for example, mark such a combination as favorite) and store the same in a web-page associated with embodiments of the invention that is personalized for use by a particular user. For example, an embodiment of the "Embed" button may be adapted to cause embedding of a specific video and text on another website specified by the user.

A specific implementation of the player is adapted to facilitate the user's creation of comments to the video and/or associated caption file for viewing by other users. For example, a "Comments" area of the interactive screen may be configured to accept and cause storing of the user's input (for example, textual input) containing a comment on a specific video and text combination. In particular, the use of virtual buttons such as a "Rate" button and/or a "Favorites" button or the like may be configured for marking a specific video-and-caption combination with a rating tag and/or marking a given combination as a favorite by a given user. In addition, an embodiment may be optionally configured to allow the user, in response to user's activation of a "Link" button, for example, to post to a social media site such as Facebook, Twitter, Digg and the like a shareable (with other users of the embodiments of the invention) link to a specific video and associated text combination or an Email content associated with such a combination. A "Playlist" button may be adapted to activate a creation, by the user, of his or her own playlist containing data representing a particular video and/or associated caption and storing suggestions made by the system based on statistical analysis of videos the given user might be interested in based on this user's video-rating history.

FIG. 1 shows an embodiment of a console 100 of the player of the invention as presented to the user on a monitor such as a computer screen. As shown, the console 100 includes a screen portion 104 configured to display, in response to the user's input, a user-identified video. The screen portion 104 is generally housed within (and, optionally surrounded by, as shown in FIG. 1) a frame portion 108 that is adapted to host the elements of graphical user interface through cooperation with which the user can activate various functions of the player. For example, as shown in FIG. 1, the frame portion 108 displays an array 112 of virtual buttons, keys, controls and information bars including a Pause/Play button 116, a Replay button 120, a Sound Volume Control (including a mute button) 124, a Play Length Control Bar 128a and an associated digital indicator 128b of elapsed/remaining video time. A bar-portion 132 of the array 112, shown in the right lower corner of the frame portion 108, contains virtual controls (such as buttons/triggers) adapted to activate various operations of the embodiment related to close-captioning function of the player. For example, an activator 136 brings in (and, alternatively, removes) the bar-portion 132 from the frame portion 108; a button 140 activates a size adjustor expanding the screen portion 104 to the full size of the screen of the monitor; a Playlist activator 144; and a Smooth button 148 that facilitates uninterrupted play of the video that is otherwise being buffered and played in a discontinued fashion. As shown, the bar-portion 132 further features virtual keys such as keys 152, 156, 158, 162, and 166 configured to provide additional operational communication between the user and the embodiment 100. For example, key 152 is adapted to activate a "video size best fit" screen-stretcher adjusting the size of the screen to the size specified by the user; key 156 is configured to determine the brightness of a "backlight", thereby changing a degree of contrast between the video and its background. The key 158 facilitates copying of the URL bookmark to clipboard, thereby providing a capability to save a copy of the video for use on another site; key 162 activates a repeat video playback; key 166 (subtitles/captions) triggers creation of a new caption file or user input of caption style such as font size, color and the like.

It is appreciated that the console of an embodiment of the player such as the console 108 is not limited to the specific example discussed in reference to FIG. 1 and may be reconfigurable in that it can be adapted to display a set of controls appropriate to activate and support of built-in player functions as required by the user.

In addition, the frame portion 108 of the embodiment 100 contains a tabloid sticker 170 displaying to the user an informative title 174a of the video that is being streamed/played with the player as well as a rating 174b of this video (as shown, in a five-star-based rating system). In addition or alternatively, a Caption activator 166, shown in the upper right corner of the frame portion 108, is adapted to transfer the operation of the embodiment into a close-captioning mode that is discussed below.

Figure 2A:
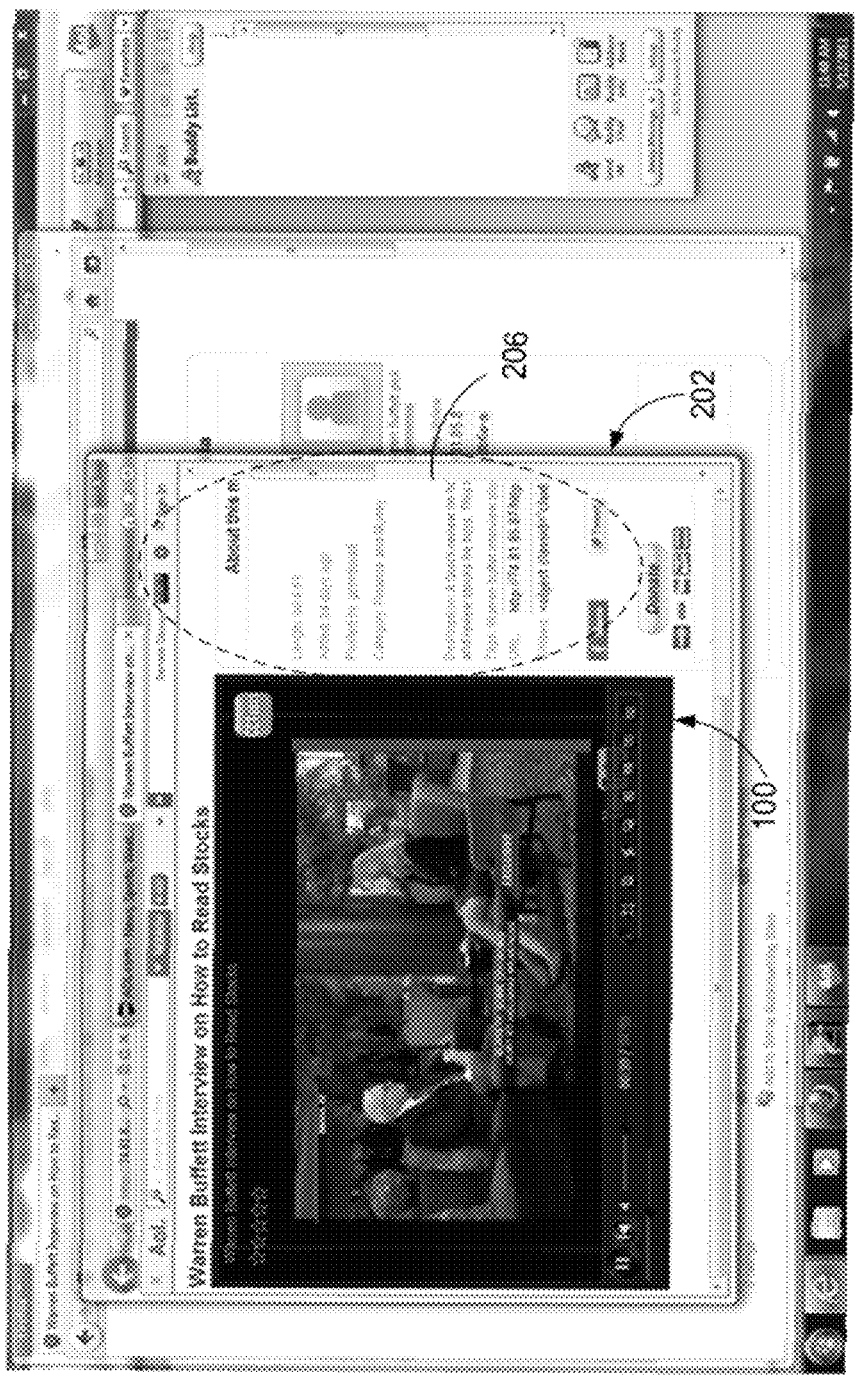
FIG. 2A shows the embodiment of FIG. 1 displayed on a computer screen in an environment of web-site that hosts the player of the invention.
Figure 2B:
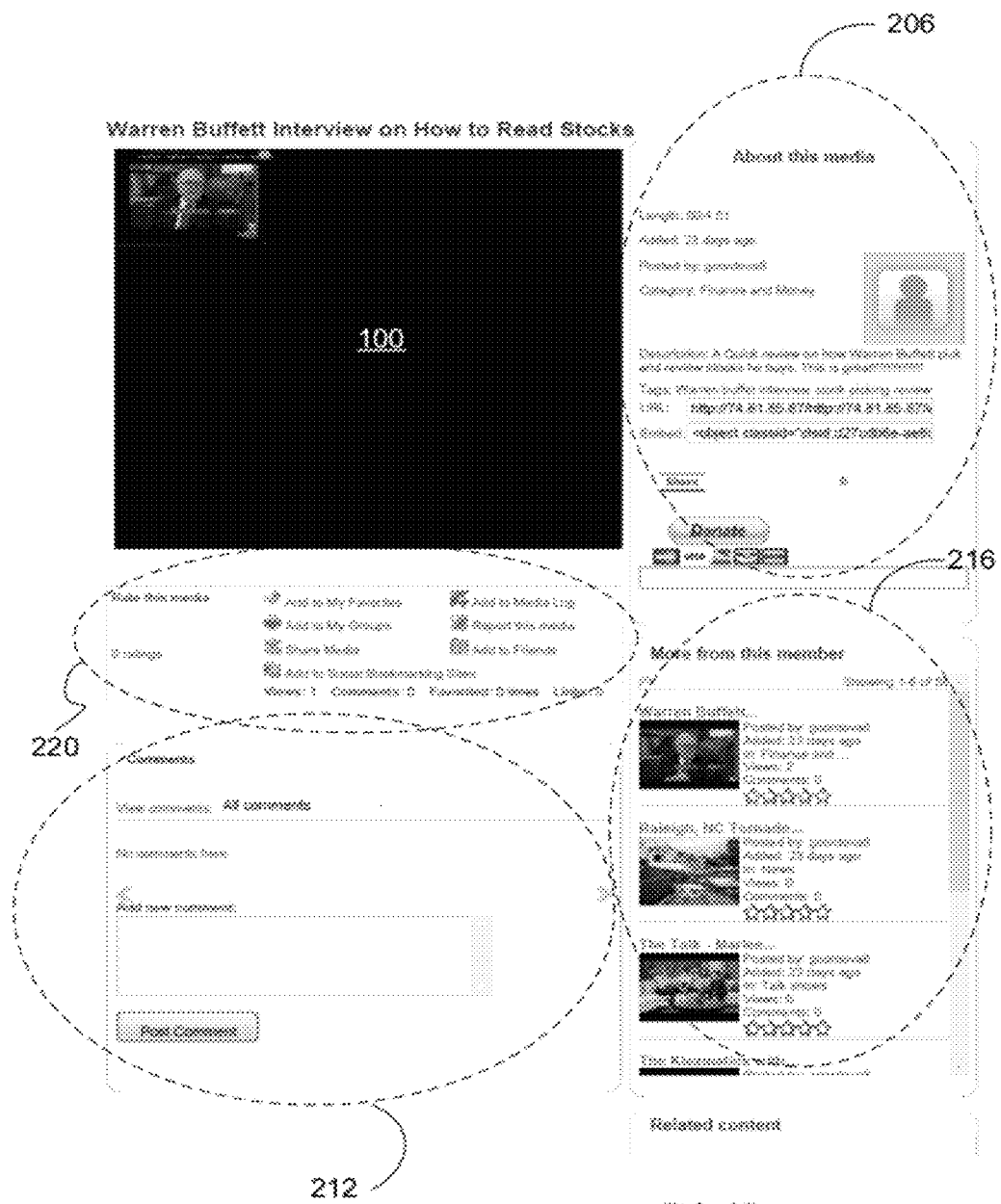
FIG. 2B provides additional details to the display of FIG. 2A.

FIG. 2A illustrates a view of the embodiment 100 integrated with a web-site hosting the services of video-replay and creation of captioning. Upon entry of the hosting web-site, the user-subscriber activates an embodiment of the player (optionally, and as shown in FIG. 2A, in a separate window 202 that additionally contains information field such as a field 206. Non-limiting examples of information displayed in an information field include description of the media (such as length of video being streamed and/or captioned; the time of initial access to the video through the embodiment of the player; the name of the user, category of video-information being streamed such as new, rock music, finance and money, or the like; tags associated with the video by the user; an URL corresponding to the web-site through or from which the video is being played, for example the address of the web-site hosting an embodiment of the player; and information related to embedding of the video). Additional information fields displayed adjacently to the console 100 may contain visually-perceivable information data representative of the activities member of the hosting web-site who is using the activated player at the moment. For example, as shown in FIG. 2B, information fields may include a Comments field 212 adapted, in response to the user input, at least to add, store/post, and display commentaries and remarks associated with a particular video or caption-related operation of the player; an activity-history field 216 in which information is stored that relates to videos that the user viewed and/or transformed by appropriate associating of the caption text files; and a social-network field 220, representing an interface adapted to grade, rate, share, report, and otherwise tag videos as directed by the user.

Figure 3A:
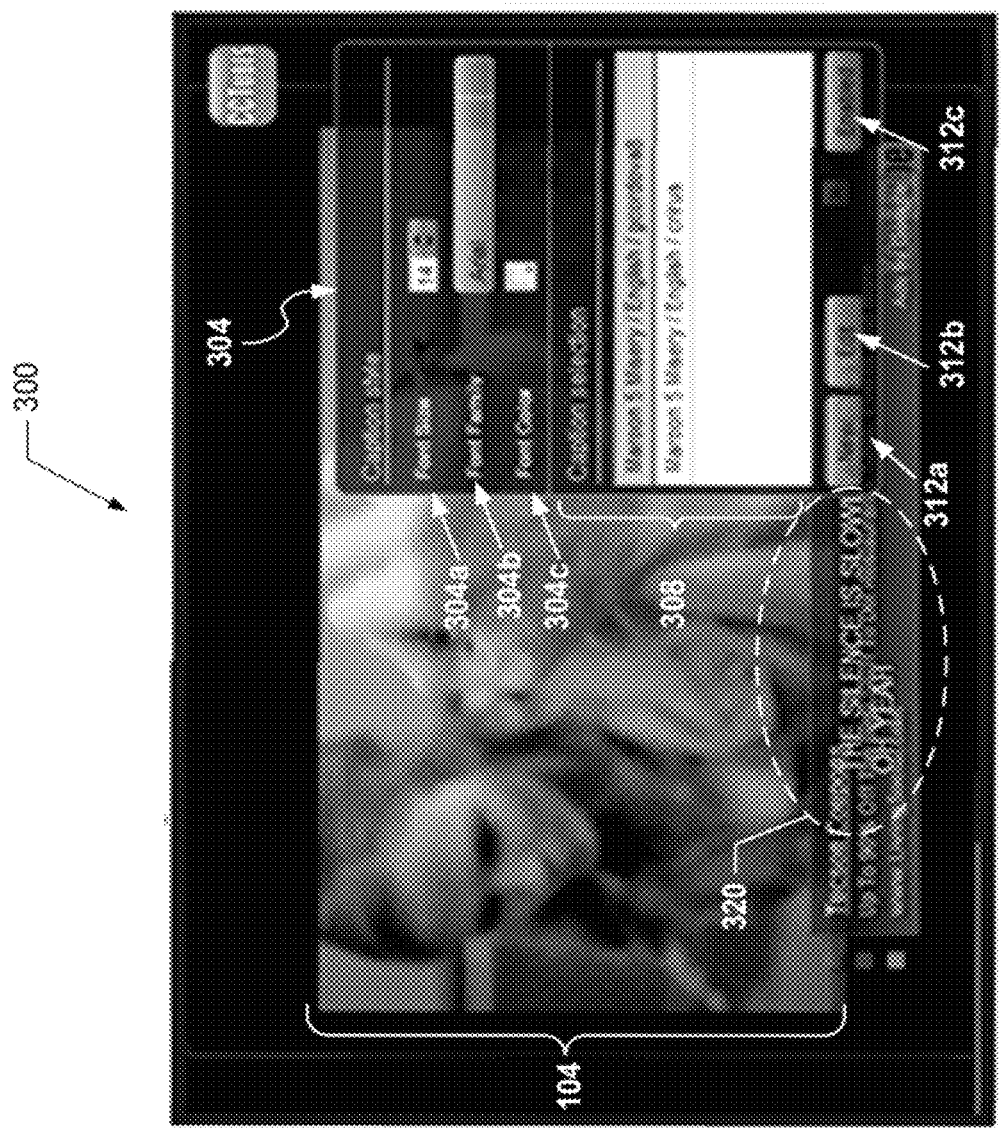
FIG. 3A shows a display representing an embodiment of a console of the player with an interface window of the Caption Editor of the player of the invention.
Figure 3B:
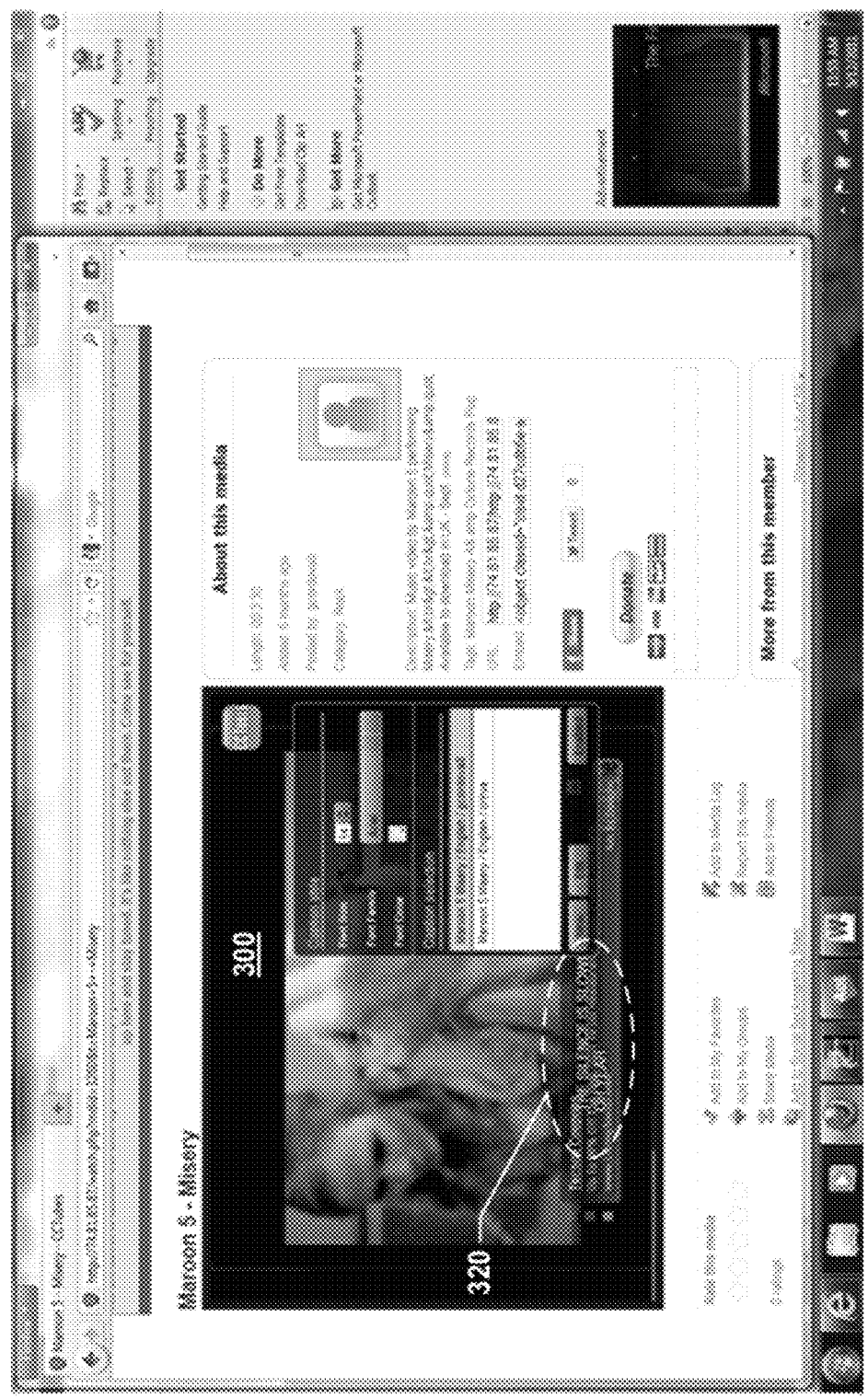
FIG. 3B illustrates the embodiment of FIG. 3A displayed on a computer screen in an environment of web-site that hosts the player of the invention.

In reference to FIGS. 3A, 3B, 4A, and 4B, an operation of the caption creation and edition with an embodiment of the player is further described. User's interaction with a Caption activator (such as, for example, a "click" on a virtual button 166) triggers a Caption module of the embodiment of the player. The Caption module manifests in displaying, in association with a console of the player (such as the console 300 of FIG. 3A), of an interface window 304 adapted to receive a user input descriptive of editing characteristics of a closed caption corresponding to the video at hand. For example, the user can specify, in corresponding sub-windows or through sub-menus 304a, 304b, 304c, a font size, font type, font color and the like parameters of the text through which the closed caption will be presented. An embodiment of the Caption module of the present invention may additionally be adapted to provide a caption-choice capability in a case when several captions (generally, different from one another) have been previously created. For example, a Caption module may include a window portion 308 configured to display an interactive list of captions from which the user can choose one to be edited. The interface window 304, as shown, also includes virtual buttons 312a, 312b, 312c carrying the corresponding indicia "New", "Edit", and "Enabled". The New button 312a establishes operational communication between the user and a Caption Creator sub-module of the player that is configured to facilitate the creation of a new caption text in time-coordination with the sequence of video frames in a given video that is being captioned. The Edit button 312b activates an operational communication between the user and a Caption Editor sub-module of the player that allows for editing of an existing caption that has been chosen from the list displayed in the window portion 308. The Enabled button 312c triggers a system enabling/disabling a replay of captions contemporaneously with a replay of the video. In case illustrated in FIG. 3A, the video that is being streamed onto the player screen 104 has been previously captioned, with the caption 320 running across the screen 104 in frame-specific coordination with the video. FIG. 3B shows the Caption module in the environment of the player housed by a web-site, as displayed on a computer monitor.

Figure 4A:
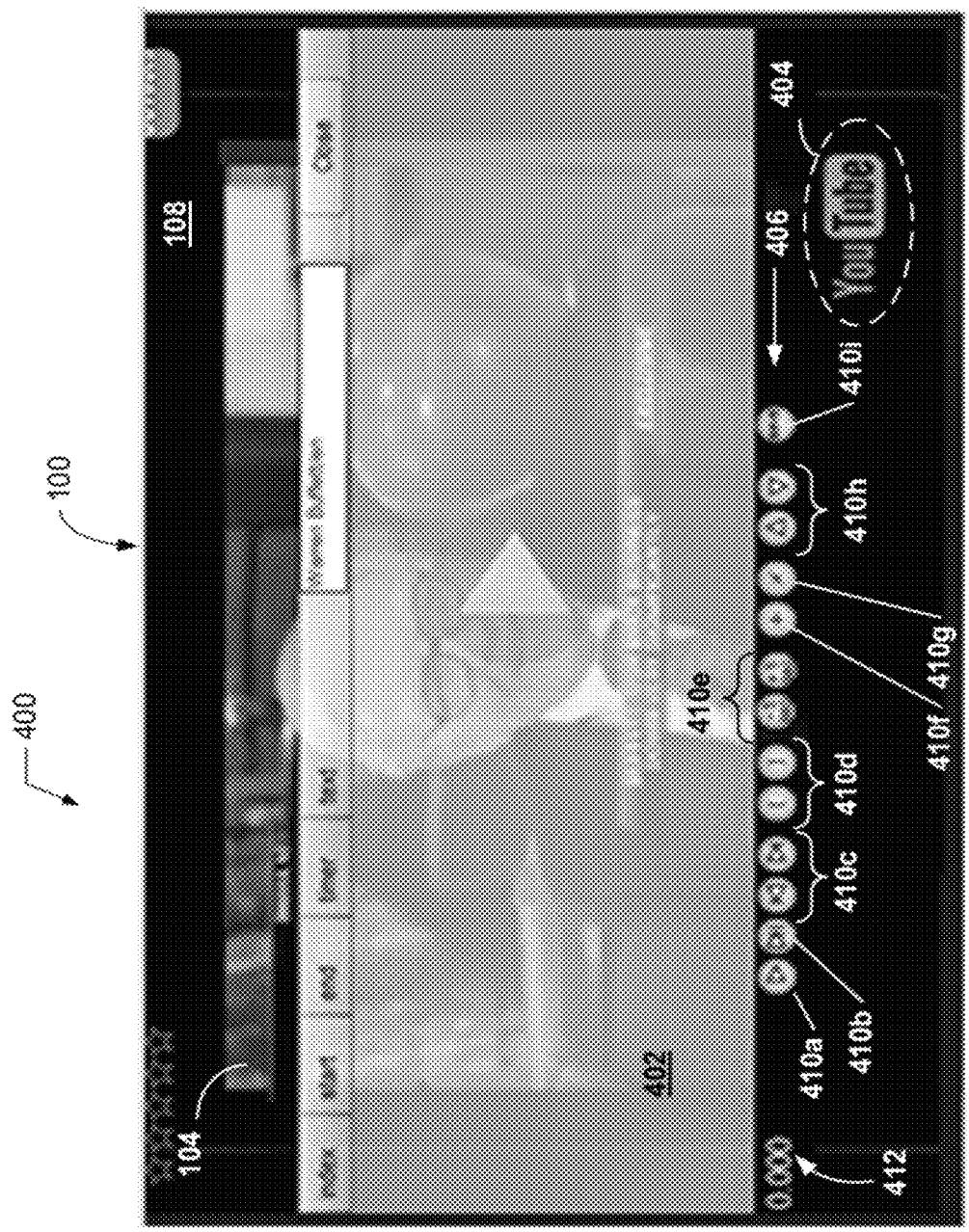
FIG. 4A shows a display of the Caption Editor with an empty caption-editing window.
Figure 4B:
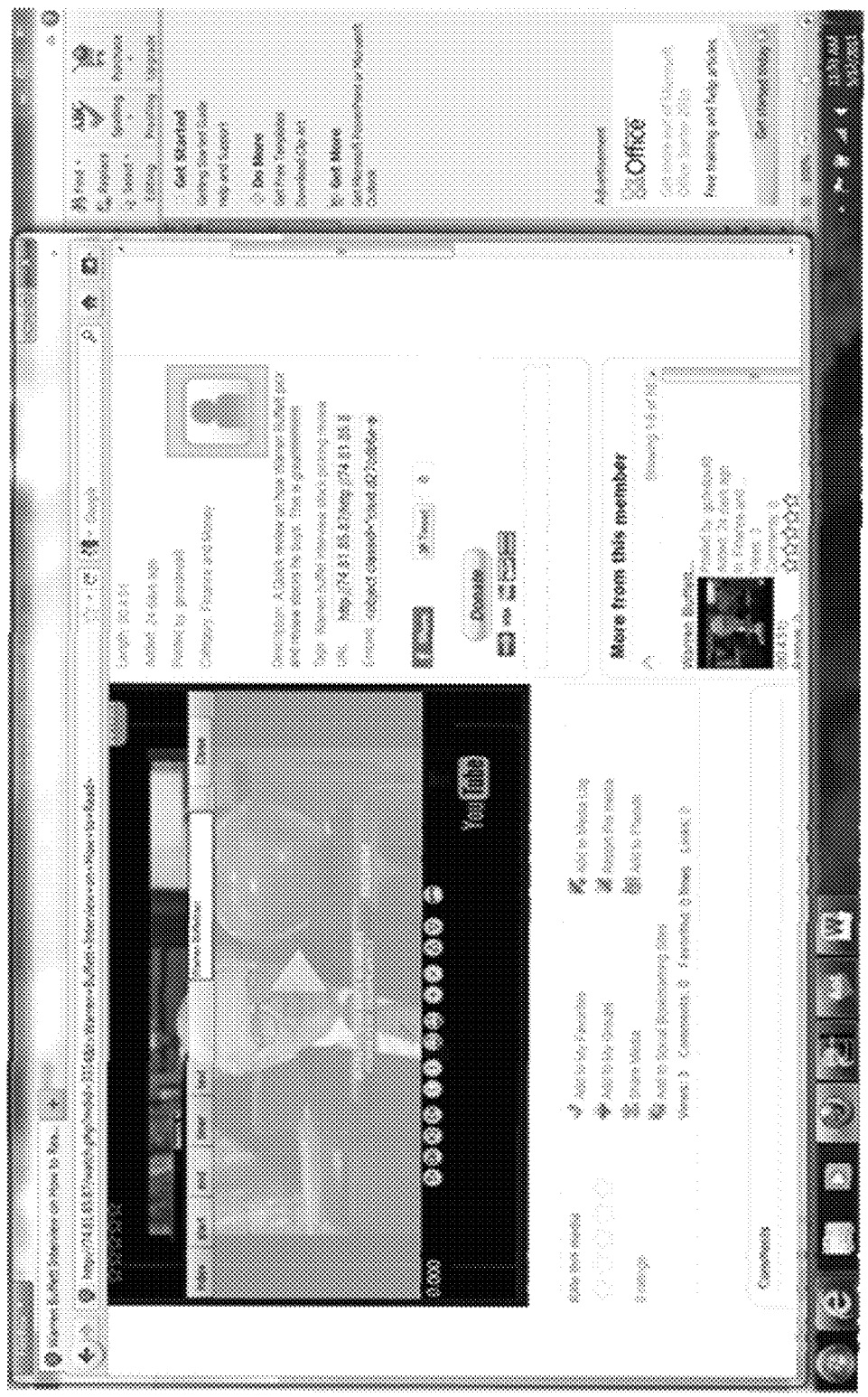
FIG. 4B illustrates the embodiment of FIG. 4A displayed on a computer screen in an environment of web-site that hosts the player of the invention.

In reference to FIGS. 4A, 4B, and 4C an embodiment 400 of the Caption Editor sub-module of the player of the present invention is described. When a new caption is being created to an un-captioned video, as shown in FIG. 4A, the embodiment 400 includes an initially empty caption-editing window 402 opened as a semitransparent overlay on top of the console 100 in response to the user input to initiate the caption-creation [procedure (which includes activation of the New button 312a of the Caption module of FIGS. 3A, 3B). The caption-editing window 402 is a user interface that facilitates at least (i) the input of text string(s) representing a caption corresponding to the video that is being streamed, from a video-source indicated by a Source Indicator 404, in the background of the caption-editing window 402 onto the screen portion 104, and (ii) a frame-specific time-sequenced coordination of this caption with the video, performed such as to establish a time correspondence between the caption being created and a particular portion or frame of the video stream. To this end, the Caption Editor sub-module is equipped with an array 406 of activators including activators such as 410a (play the video with a caption overlaid on it); 410b (play caption clip, playing captions through the video), a pair 410c (a pointer choosing between the previous and next captions); 410d, 410e (set caption's start and end); 410f (add caption text, to be used when a user types in a caption and needs to add text); 410g (delete caption); 410h (move a particular caption string with respect to a particular video frame or time of the video stream); and 410i (save button, configured to automatically effectuate saving of captions at predetermined time intervals, but can also be used to have a caption saved at any time), some of which carry well-recognized indicia representing functions of a music or video player. Activation of individual buttons of the actuator-pair 410d causes the Caption Editor sub-module to start or finish, respectively, a particular caption line that is being inputted. Activation of individual button of the actuator-pair 410e is adapted to cause the Caption Editor sub-module to advance the video-stream either backward or forward, depending on the choice of a button, by a time-increment factor that the Caption Editor sub-module is programmed with. In one embodiment, such advancement of the video-sequence can be done with 0.5 sec increments. The embodiment 400 may additionally include a timer 412 keeping independently track of time elapsed as the video is being played. A view of the Caption Editor sub-module as part of the web-site hosting an embodiment of the player is shown in FIG. 4B.

Figure 4D:
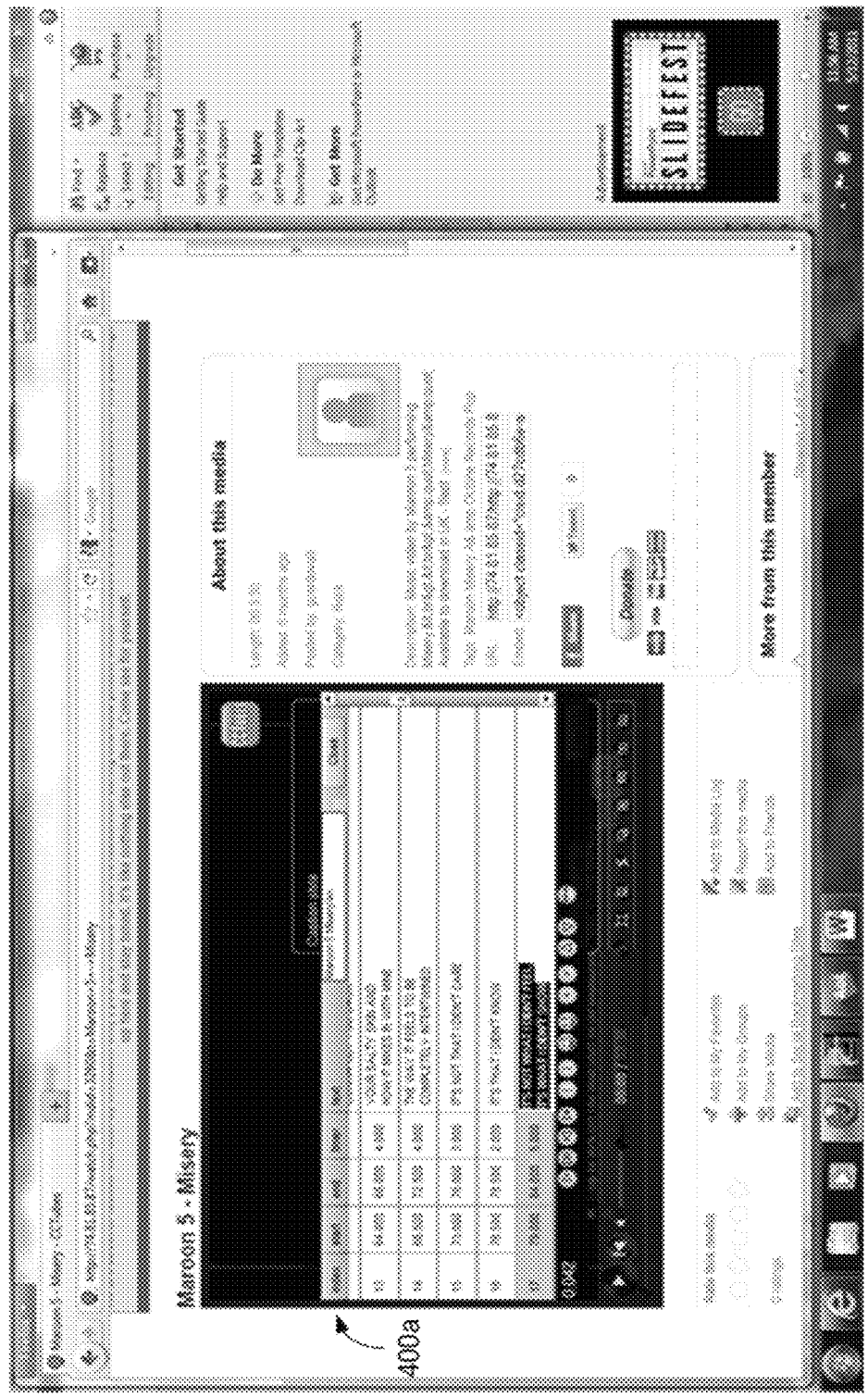
FIG. 4D illustrates the embodiment of FIG. 4C displayed on a computer screen in an environment of web-site that hosts the player of the invention.

Referring further to FIG. 4A, the initially empty caption-editing window 402 is formatted to include a caption-input display defined by sub-titles such as "index", "start", "end", "timer", "text" and the like which, when the user initiates a new caption creation process by activating an appropriate trigger from the array 406, receives an individual caption inputted by the user and displays them in respective correspondence with video frames that signify the beginning and the ending of such individual caption. As an illustration, FIG. 4C shows the caption-input display of the caption-editing window 402 that has been at least partially-filled with captions. As shown, the caption-input display is adapted to receive that text-string-input at a direction of the user, and display this input (for example, as shown, in a form of the table). The inputted text string is additionally captured and stored in a tangible compute-readable storage memory by the embodiment of the invention. In the embodiment 400a, each row of the caption table contains an index 420, indicating a numerical order of a caption stored in this row; a star-indicator 422 and an end-indicator 424 denoting, respectively, moments of time (for example, in seconds) corresponding to the beginning and the end of a caption stored in this row, (the zero moment of time is defined by the beginning of the video stream); a timer-indicator 426 showing the duration of a caption; and the text-string representing the caption stored in this row of the table. For example, as illustrated in the last row of the caption table displayed in the caption-editing window 403 of FIG. 4C, a chosen portion of the video (tagged with the label displayed in the ticker tab 428 of the table) is the seventeenth portion of the video that has been captioned (index-column 420 value is 17) and is defined by video frames sequenced between the seventy-ninth and eighty-fourth seconds of the tagged video-stream (start-column 422 value is 79.00; end-column 424 and value is 84.00). The text-string, with which his chosen portion of the video has been captioned reads "It's not what I don't feel, it's what I don't know" (as displayed in the text column 426). During the caption-creation process, if modifications to the already created captions are required, the movement between the corresponding rows and columns of the caption table can be effectuated with the use of actuators such as, for example, 410*e* (along the video-stream, in specified time increments) and 410*h* (up and down the table). At any time during the caption-creation process (for example, once the caption-sequence has been inputted, in frame-specific and time-sequenced fashion, into the caption-editing window 402), the inputted caption can be stored in tangible computer-readable medium operably associated with the embodiment of the player by activating the Save button. The caption-creating process can be stopped and the caption-editing window 402 closed via a Close key 430. FIG. 4D illustrated the view of the Caption Editor sub-module, at the time of caption creation process, within a window of the player-hosting web-site.

Referring again to FIGS. 3A, 3B, 4C, and 4D, the operation of the Caption Editor sub-module in a caption-editing mode is described. When a user requests a show of a video that has been previously captioned, and in response to the user input that includes activation of the Caption trigger 166 of an embodiment of the player, the Caption module of the player opens the interface window 304 that displays textual characteristics 304*a*, 304*b*, 304*c* of the existing caption. The system of the invention utilizes information retrieval techniques to select the caption data when interest in having access to such data is indicated through the user input. Activation of the Edit virtual button 312*b* causes the Caption module to enter the caption-editing mode, during which the captions that have been previously created for the video at hand are displayed in the caption-editing window 402, as discussed above. Through manipulations of the triggers 406, the user causes the Caption Editor sub-module to transform the already-existing caption text-strings in accord with the user's directions. For example, the previously created captions can be re-formatted to correspond to different time windows of the video stream, or the text of the caption(s) can be re-written. At any time during the editing process the instantaneous caption can be stored in the player's memory by activating the Save button 410*i* and the caption-editing process can be closed via a Close key 430.

Figure 5:
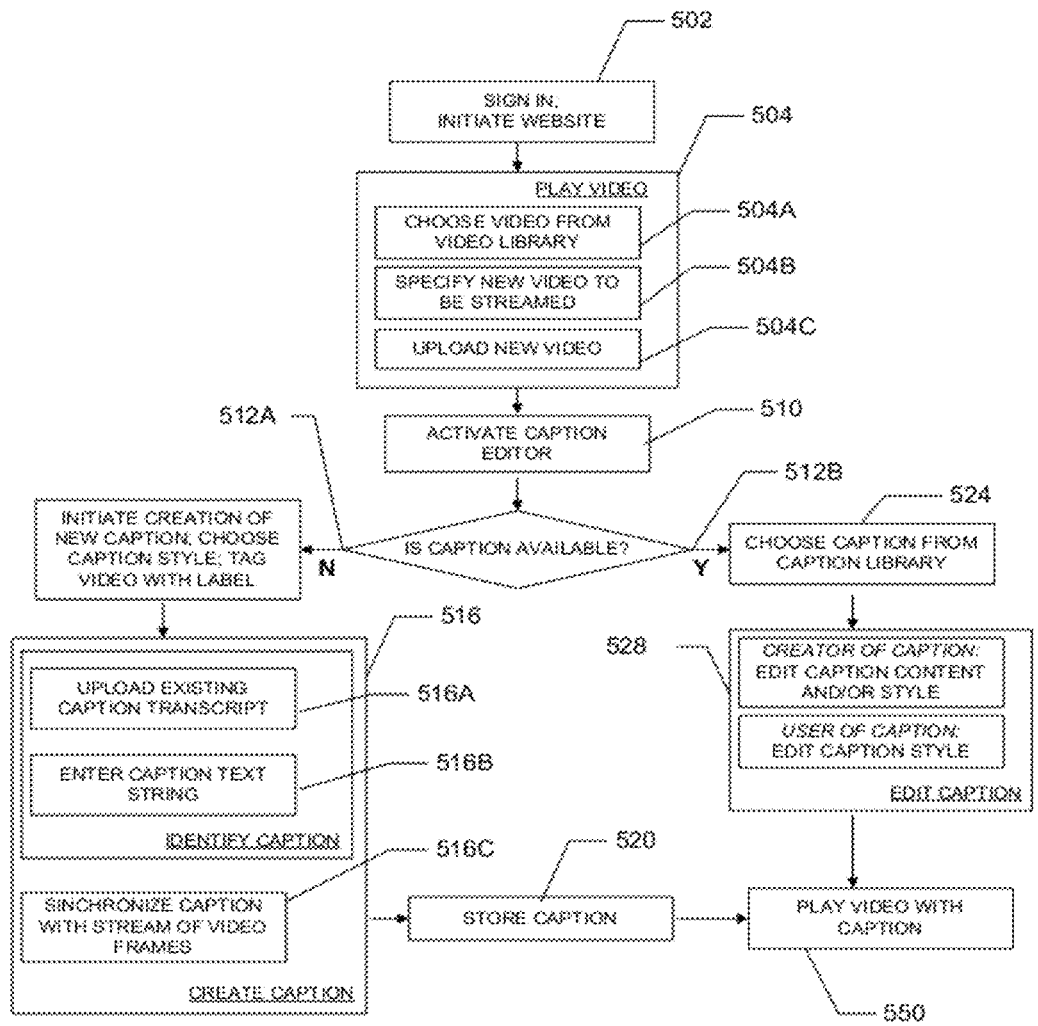
FIG. 5 shows schematically a flow-chart representing an embodiment of the caption editing process.

A simplified flow-chart of a caption-creation process is shown schematically in FIG. 5, and is better understood in continuing reference to FIGS. 3 and 4. Initiation of process is indicated as step 502 is followed by step 504, at which the user identifies a video to be worked with by either choosing a video from a library associated with an embodiment of the player, 504*a*, or identifying a video from a third-party's web-site, 504*b*, or, alternatively, uploading his own video, 504*c*. Once the video has been identified and displayed on the screen of the console of the player, the user can activate the new caption interface window 304 and/or Caption Editor sub-module (discussed in reference to FIGS. 4A-4C) at step 510.

If there are no captions available, 512A, the user can, at step 514, initiate creation of a new caption by pressing a corresponding New virtual button 312 in the interface window 304, and select the caption style and language characteristics as discussed in reference to FIG. 3A. The caption of choice is then created at step 516, which may include uploading of an already-available transcript file, 516A, into the caption editor for further editing and time-coordination (synchronization) with the video in a frame-specific manner or, alternatively, manually editing a new caption at step 516B by activation a Caption Editor sub-module. Contemporaneously with or following the identification of the caption of steps 516A, 516B, the caption is further synchronized with the video stream at step 516C. An embodiment of creating/editing/timing of a new caption has been already discussed in reference to FIGS. 4A-4C. In particular:

Inputting text can be started by first pushing the Play button of the video, pressing the add caption button 410*f*.

One can then press Enter. Every time Enter is pushed it starts and stops the video. This way one can play a section of the video and then input the text to go along with that section. Pressing Enter also sets the time start and stop.

This process is continued until the complete text has been inputted. If the length of a text-string is under 25 characters, the timer increment is about 2 seconds; 35 characters—about 3 seconds; 45 characters—about 4 seconds. Inputting any text-string that is longer than 45 characters is preferably done by splitting the string into two or more sub-strings.

A use of the vertical bar "|" in the middle of a caption can additionally be activated to span the caption over two lines in the box.

Once the caption has been saved, as discussed below, the user can go back and edit the time-increments (e.g., change with which video-frame a particular caption is associated) by going to a corresponding index-numbered box 420 and adjusting the start times 422 with the set caption start and end buttons 410*d*, and/or change time in +0.5 or −0.5 second intervals with 410*e*.

During the process of creation, captions can be added, 410*f*, or deleted, 410*g*. Other caption-editing features have been discussed above in reference to FIGS. 4A-4C.

Activation of a complete caption after it has been inputted (or, alternatively, periodic automatic saving) is done at step 520 by pressing button Save such as the button 410*i*. Close the Caption Editor sub-module and play the video with the captions overlaid on the video, at step 550. Additional captions in other languages can be added at a different time.

Alternatively, when at least one caption has been already created for or is available in association with the chosen video, 512B, the user can choose, at step 524, an available caption from the list displayed in the window portion 308 (see FIG. 3A) and edit it, at step 528, within limits defined in part by a relation of the user with the chosen caption. In particular, a caption-creator can edit content of the caption, while a person who is a user only (and not a creator of that caption) is permitted to change only the caption's style but not the content. A created caption text will appear in a corresponding caption window 304 with a tag displayed as a title along with user's username and language of the caption. Users just wanting the captions can enter this window 304 and select their preferences of font size, style and color.

In further reference to FIGS. 2A and 2B, a user can upload a video on a web-site hosting the embodiment of the player and, using the capabilities provided by the hosting web-site, embed the uploaded video. Alternatively, a user can identify a video stored on a third party's web-site by pasting the video's URL into an appropriate field 206, as shown in FIG. 2A. In this case, the hosting web-site searches the internet databases and brings a thumbnail of the video found through URL into the field 216 for further embedding. The hosting web-site additionally automatically fills in the other information in the field 216, such as the title of the video, length, description, tags. A category for the embedded video is generally specified by the user himself. If the video at hand already has captions, the user may additionally check an information box that so specifies (this enables the video once it's embedded to have the little icon in the lower left-hand corner that says SUB/CC showing that it has some captions already) as well as specify the language of the caption. More captions in different languages can be added later. The hosting web-site is additionally configured to require the user that the user abides by the terms and condition of the website, and enter a confirmation of no use of violence or copyrighted material that the user is embedding, and activates a submission of the material/video to be embedded. In one embodiment, safeguard sub-modules are adapted to assure that if the material proposed by the user is copyrighted such material cannot be embedded for future captioning/playing.

Embodiments of the player of the invention have been described as including a processor controlled by instructions stored in a memory. The memory may be random access memory (RAM), read-only memory (ROM), flash memory or any other memory, or combination thereof, suitable for storing control software or other instructions and data. Some of the functions performed by the discussed embodiments have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. The invention should not be viewed as being limited to the disclosed embodiment(s).

The invention claimed is:

1. An article of manufacture comprising;
a programmable processor; and
a non-transitory tangible computer-readable storage medium having computer-readable program product disposed therein to stream video data stored in a storage associated with a web-site, wherein said storage medium is in communication with said article of manufacture, the computer-readable program product containing computer-readable code that, when loaded on a computer, causes said programmable processor to effect implementing, on a monitor, a video-viewing apparatus having a computer-implemented graphical user interface (UI);
retrieving, in response to a user input applied to said UI, video data identified by the user from said storage medium; and
displaying said retrieved video data, on said video-viewing apparatus, juxtaposed in a time-sequenced, with respect to frames of said video data, fashion with a first set of textual data that has been either retrieved from said storage medium or created by a user in response to audible contents of said video data, wherein said first set of textual data transcribes said audible contents,
wherein said displaying includes
receiving, with said programmable processor and from said non-transitory tangible computer-readable storage medium, the first set of textual data; and
displaying said received first set of textual data in a window, which window is movable anywhere across said video-viewing apparatus in response to a user input applied to said window.

2. An article according to claim 1, wherein said implementing includes displaying a video-viewing apparatus on said display, the video-viewing apparatus including
a screen portion, and
a console portion circumscribing said screen portion and containing actuators and associated indicia,
a first window containing visually-perceivable identifier representing said retrieved video data, and
a second window configured to receive user input.

3. An article according to claim 2, wherein the video-viewing apparatus further includes a caption module adapted
to be actuated with one of the actuators,
to display said first set of textual data,
to edit at least a portion of said first set of textual data, and
when said first set of textual data is a set that has been created by the user in response to said audible contents, to form a new set of textual data in response only to an input from the user who has created said first set of textual data,
wherein said new set of textual data transcribes said audible contents.

4. An article according to claim 1, wherein said displaying includes displaying said first set of textual data synchronized with said video data in a frame-specific manner.

5. An article according to claim 1, wherein said UI includes one or more actuators and associated indicia, said one or more actuators configured to trigger, in response to a user input:
a) establishing an operational communication with said web-site,
b) determining a presence of said first set of textual data on said web-site,
c) creating said first set of textual data if it does not exist,
d) forming said new set of textual data,
e) creating a first identifier for said first set of textual data and storing it on said storage medium and, when said new set of textual data has been formed, creating a new identifier for said new set of textual data and storing it on said storage medium,
f) displaying, on said video-viewing apparatus, a scroll-down list containing identifiers of sets of textual data stored on said storage medium,
g) uploading a set of textual data from said stored sets of textual data in response to a user's choice of an identifier from the scroll-down list,
h) synchronizing said uploaded set of textual data with said video data on a frame-by-frame basis, and i) storing data representing user's feedback to said retrieved video data.

6. A computer program product for displaying, on a computer-implemented video-player, video data overlayed with text that has been either previously stored on a storage medium or created by a user of said video-player in response to audible contents of said displayed video data, wherein said text transcribes said audible contents, the computer program product comprising a computer-usable tangible storage medium having computer-readable program code thereon, the computer-readable program code including:

(i) program code for:
- implementing, in a computer-system,
  - (ia) a visually-perceivable video-player having a monitor,
  - (ib) a console associated with said monitor and hosting a user-interface (UI) having actuators responsive to a user input, and
- activating, in response to such input, an operation of said visually-perceivable video-player by applying the user input to one or more of said actuators;

(ii) program code for, in response to an input from a user applied to said UI,
- retrieving video data stored on an identified server,
- determining if said video data has associated text representing contents of said video data,
- when said retrieved data video data do not have first text that transcribes said audible contents and that has been previously stored on the storage medium, and following a user authorization, receiving new text created by a user in response to said audible contents;
- creating a tag representing an identity of the authorizing user;
- editing said new text in response only to an input from the user who has created said new text to form edited text; and
- storing said edited text in association with said computer-usable tangible storage medium;

and (iii) program code for:
- displaying on said monitor said retrieved video-data overlayed with a window containing, based on the choice of the user, any of said first text, new text, and edited text, said window being movable across the monitor in response to a user input.

7. A computer program product according to claim 6, wherein the computer-readable program code further includes program code for embedding, in response to a user input, said visually-perceivable video-player on a web-site specified by the user.

8. A computer program product according to claim 6, wherein said program code for editing includes program code for creating a computer-implemented and visually-perceivable caption module having
- a window portion configured to display an interactive list of text strings available for editing by the user, and
- caption editor equipped with an array of activators configured to implement frame-specific time-sequenced coordination of a test string, selected by the user from said interactive list, with said video data.

9. A computer program product according to claim 6, wherein said program code for storing includes program code for storing said edited text in association with said computer-usable tangible and in association with at least one tag representing a visually-perceivable characteristic of said edited text but not its content.

10. A computer program product according to claim 6, wherein said program code for editing includes program code for
- requesting and receiving, from a user, a user ID and comparing such received user ID with the tag representing an identity of the authorizing user,
- editing any of content and style of said new text only when said received user ID matches said tag, and
- editing only style but not content of said new text when said received user ID does not match said tag.

11. An article of manufacture comprising;
- a programmable processor; and
- a non-transitory tangible computer-readable storage medium having computer-readable program product disposed therein to stream video data stored in a storage associated with a web-site, wherein said storage medium is in communication with said article of manufacture, the computer-readable program product containing computer-readable code that, when loaded on a computer, causes said programmable processor to effect
  - implementing, on a monitor, a video-viewing apparatus having a computer-implemented graphical user interface (UI);
  - retrieving, in response to a user input applied to said UI, video data identified by the user from said storage medium; and
  - displaying said retrieved video data, on said video-viewing apparatus, juxtaposed in a time-sequenced, with respect to frames of said video data, fashion with a first set of textual data that has been either retrieved from said storage medium or created by a user in response to audible contents of said video data, wherein said first set of textual data transcribes said audible contents,
  - wherein said UI includes one or more actuators and associated indicia, said one or more actuators configured to trigger, in response to a user input:
    a) establishing an operational communication with said web-site,
    b) determining a presence of said first set of textual data on said web-site,
    c) creating said first set of textual data if it does not exist,
    d) forming said new set of textual data,
    e) creating a first identifier for said first set of textual data and storing it on said storage medium and, when said new set of textual data has been formed, creating a new identifier for said new set of textual data and storing it on said storage medium,
    f) displaying, on said video-viewing apparatus, a scroll-down list containing identifiers of sets of textual data stored on said storage medium,
    g) uploading a set of textual data from said stored sets of textual data in response to a user's choice of an identifier from the scroll-down list,
    h) synchronizing said uploaded set of textual data with said video data on a frame-by-frame basis, and
    i) storing data representing user's feedback to said retrieved video data.

12. An article according to claim 11, wherein said implementing includes displaying a video-viewing apparatus on said display, the video-viewing apparatus including
- a screen portion, and
- a console portion circumscribing said screen portion and containing
  - actuators and associated indicia,
  - a first window containing visually-perceivable identifier representing said retrieved video data, and a second window configured to receive user input.

13. An article according to claim 12, wherein the video-viewing apparatus further includes a caption module adapted to be actuated with one of the actuators,
- to display said first set of textual data,
- to edit at least a portion of said first set of textual data, and,
- when said first set of textual data is a set that has been created by the user in response to said audible contents, to form a new set of textual data in response only to an input from the user who has created said first set of textual data,
  - wherein said new set of textual data transcribes said audible contents.

14. An article according to claim 11, wherein said displaying includes
- receiving, with said programmable processor and from said non-transitory tangible computer-readable storage medium, the first set of textual data; and
- displaying said received first set of textual data in a window, which window is movable anywhere across said video-viewing apparatus in response to a user input applied to said window.

15. An article according to claim 11, wherein said displaying includes displaying said first set of textual data synchronized with said video data in a frame-specific manner.

* * * * *